(12) United States Patent
Agarwal et al.

(10) Patent No.: US 8,955,032 B2
(45) Date of Patent: Feb. 10, 2015

(54) ASSESSING NETWORK AND DEVICE COMPLIANCE WITH SECURITY POLICIES

(75) Inventors: Ankit Agarwal, Bethesda, MD (US); Nick Bastin, Wooster, OH (US); Pradeep K. Singh, Arlington, VA (US); Seth Martin, Washington, DC (US)

(73) Assignee: Riverbed Technology, Inc., San Francisco, CA (US)

( * ) Notice: Subject to any disclaimer, the term of this patent is extended or adjusted under 35 U.S.C. 154(b) by 2292 days.

(21) Appl. No.: 11/776,721

(22) Filed: Jul. 12, 2007

(65) Prior Publication Data

US 2008/0022357 A1 Jan. 24, 2008

Related U.S. Application Data

(63) Continuation-in-part of application No. 11/505,171, filed on Aug. 16, 2006.

(60) Provisional application No. 60/807,243, filed on Jul. 13, 2006, provisional application No. 60/709,725, filed on Aug. 20, 2005.

(51) Int. Cl.
*H04L 29/00* (2006.01)
*H04L 29/06* (2006.01)

(52) U.S. Cl.
CPC .................................... *H04L 63/20* (2013.01)
USPC ............................................... 726/1; 713/166

(58) Field of Classification Search
USPC .............................................. 726/1; 713/166
See application file for complete search history.

(56) References Cited

U.S. PATENT DOCUMENTS

2004/0117624 A1* 6/2004 Brandt et al. ................. 713/166

* cited by examiner

*Primary Examiner* — Brandon Hoffman
*Assistant Examiner* — Michael D Anderson
(74) *Attorney, Agent, or Firm* — Park, Vaughan, Fleming & Dowler LLP

(57) ABSTRACT

All of the transit services that each device is expected to provide are determined and contrasted with the transit configuration of each device. Because the transit configuration of each device may be state-dependent, the service items within each application service are processed in sequential order. Sequences of service items are associated with connection groups, and each of the routes associated with each connection group is determined based on the sequential order of the service items. The configuration of each device along each route is processed to determine the services that will be permitted or denied, based on its current configuration. Each desired transit service item is compared to the transit configuration provided by each device to identify any inconsistencies and/or violations.

35 Claims, 4 Drawing Sheets

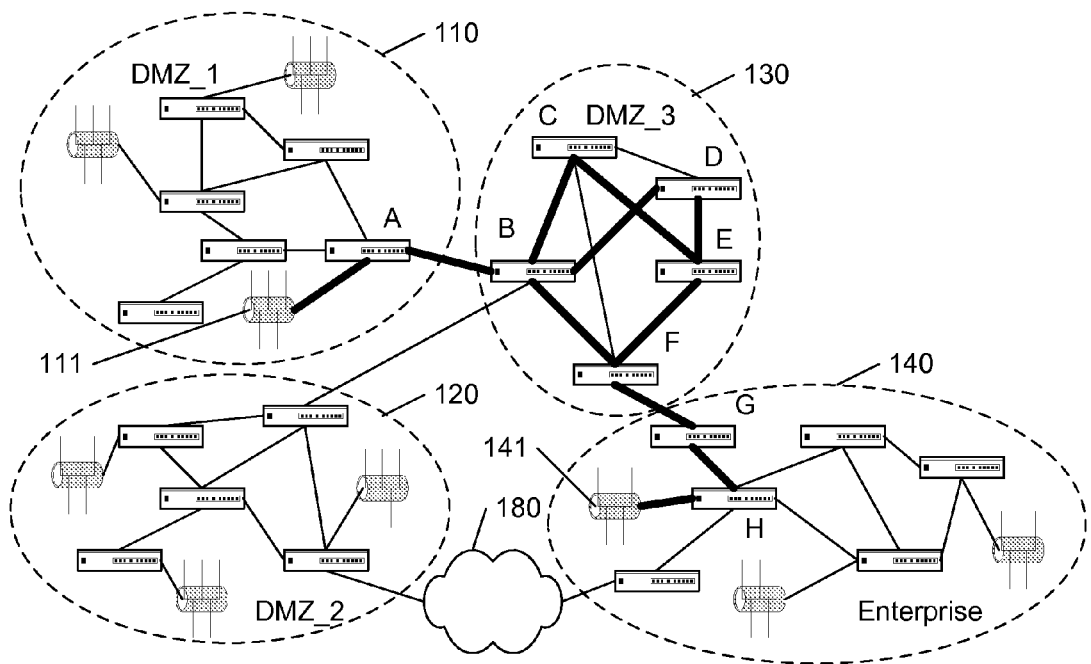

FIG. 1

| Name | <ftp-active> | | | | | | |
|---|---|---|---|---|---|---|---|
| ID | Proto | C Port | C Alias | S Port | S Alias | Direction | Ports Dyn Opened | PreReq |
| 1 | TCP | >1024 | CLIENT | 21 | SERVER | C->S | NO | |
| 2 | TCP | ID=1 | CLIENT | ID=1 | SERVER | S->C | fw1.opnet.com | 1 |
| 3 | TCP | >1024 | CLIENT | 20 | SERVER | S->C | fw1.opnet.com | 2 |
| 4 | TCP | ID=3 | CLIENT | ID=1 | SERVER | C->S | fw1.opnet.com | 3 |

FIG. 2

| Service Name | Service Alias | Device Group | Rule |
|---|---|---|---|
| <ftp-active> | CLIENT | Enterprise | Allow |
| | SERVER | DMZ_1 | |
| <ftp-active> | CLIENT | DMZ_1 | Allow |
| | SERVER | DMZ_2 | |
| <http> | SOURCE | Enterprise | Deny |
| | DESTINATION | DMZ_1 | |
| <telnet> | SOURCE | Enterprise | Allow |
| | SINK | DMZ_2 | |

FIG. 3

ASSESSING NETWORK AND DEVICE COMPLIANCE WITH SECURITY POLICIES

This application is a Continuation-in-Part of U.S. patent application Ser. No. 11/505,171, "ANALYZING SECURITY COMPLIANCE WITHIN A NETWORK", filed 16 Aug. 2006, and incorporated by reference herein, and claims the benefit of U.S. Provisional Patent Applications 60/709,725, filed 20 Aug. 2005, and 60/807,243, filed 13 Jul. 2006, each of which is incorporated by reference herein.

BACKGROUND AND SUMMARY OF THE INVENTION

This invention relates to the field of network management, and in particular to a method and system for analyzing and verifying compliance with security policies among devices in a network.

Network security is a continuing concern among network users and network managers. In a secure computer network, to prevent unauthorized access to the network, only a specified set of systems, services, and applications are permitted to use the network. Additionally, within a network, not all systems, services, and applications are permitted to communicate with each other. The term 'security policy' is used to identify the connections that should be permitted or denied between network elements.

Certain devices within a network, such as routers and firewalls, can be configured to enforce security policies within the network, and complex security policies may require that multiple devices be compatibly configured.

Verifying that each device in a network is properly configured to effect the intended security policies is a daunting task, particularly in complex networks that include multiple communication paths among network elements. This task is further complicated by the fact that different devices may use different schemes for effecting the same security policy. A security analyst must typically be aware of a variety of vendor-dependent configuration formats and protocols, and must be aware of each configuration setting's effect on the security policy of each connection to the device.

Often, security policy analysis and verification is a 'hit or miss' process, with minimal analytical basis. A security analyst reviews configuration settings, corrects any obvious security loopholes, and then verifies security by attempting to send messages to or from a variety of elements on the network. If a message traverses a denied connection, or is blocked from a permitted connection, the cause of the error is determined, the configuration is modified, and the test is repeated.

This hit or miss process is further complicated by the fact that the transit configuration of network devices is often state-dependent. For example, routers that support dynamic configuration, such as Application Layer Packet Inspection, Deep Packet Inspection, and so on, are often configured to enable an incoming connection from an external device only after an outgoing message is sent to that external device. Thus, to effectively test each security policy that is to be applied to a network, the appropriate test sequence would need to be applied to each potential route upon which the communications may transit.

It would be advantageous to provide a method and system for identifying and verifying compliance with security policies within a network. It would also be advantageous to provide a method and system for identifying network configuration data that is inconsistent with intended security policies.

These advantages, and others, can be realized by a method and system that determines all of the transit services that each device is expected to provide, and contrasts these transit services to the transit configuration of each device. Application process sequences of request-response type connections are defined as 'services', and the security transit policy defines whether the service is to be permitted or denied between identified device groups. Connection groups identify services between each source and destination group pair, and each of the routes associated with each connection group is determined and configured based on the sequential order of the service items within each service. The configuration of each device along each route is processed to determine the services that will be permitted or denied, based on its current configuration. Each desired service item on the device is compared to the transit security configuration of each device to identify any security inconsistencies or violations.

BRIEF DESCRIPTION OF THE DRAWINGS

The invention is explained in further detail, and by way of example, with reference to the accompanying drawings wherein:

FIG. 1 illustrates example device groups in an example network.

FIG. 2 illustrates a defined service between a client and a server device.

FIG. 3 illustrates a set of transit policies between device groups.

Throughout the drawings, the same reference numerals indicate similar or corresponding features or functions. The drawings are included for illustrative purposes and are not intended to limit the scope of the invention.

DETAILED DESCRIPTION

Figures 4A, 4B:
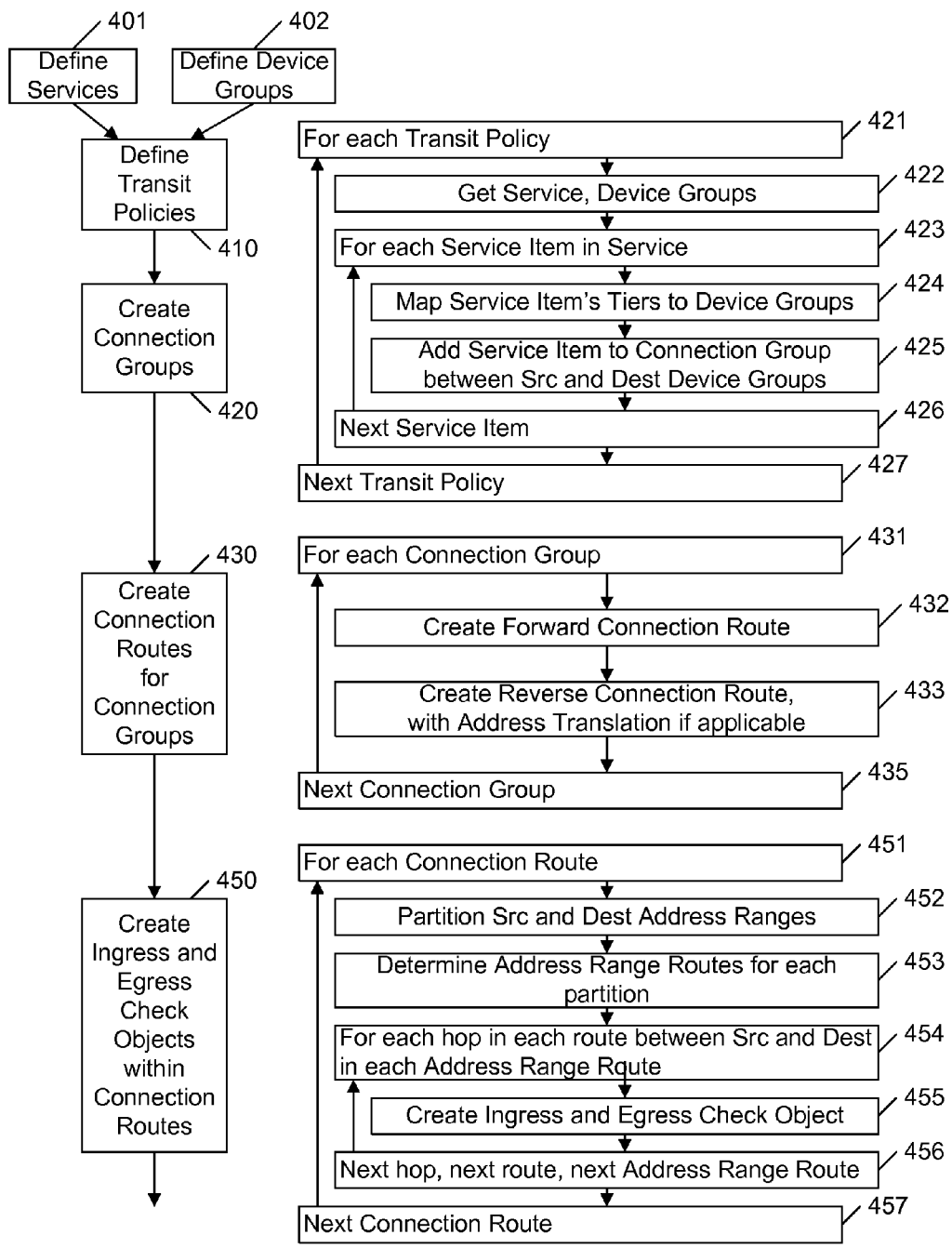
FIGS. 4A-4B illustrate example flow diagrams for determining interface check objects based on defined transit policies in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the parent application to this continuation-in-part, U.S. patent application Ser. No. 11/505,171, "ANALYZING SECURITY COMPLIANCE WITHIN A NETWORK", filed 16 Aug. 2006 for Pradeep Singh, Ankit Agarwal, Alain Cohen, Venuprakash Barathan, and Vinod Jeyachandran, and incorporated by reference herein, a method and system is disclosed that uses a security policy database that identifies the intended security policies within a network to generate test traffic that is configured to test each defined security policy, and simulates the propagation of this traffic on a model of the network. The model of the network includes the configuration data associated with each device, and thus, if devices are properly configured to enforce the intended security policies, the success/failure of the simulated test traffic will conform to the intended permit/deny policy of each connection. Differences between the simulated message propagation and the intended security policies are reported to the user, and diagnostic tools are provided to facilitate identification of the device configuration data that accounts for the observed difference. Additionally, if a network's current security policy is unknown, test traffic is generated to reveal the actual policy in effect, to construct a baseline intended security policy.

Copending U.S. patent application Ser. No. 11/735,474, "AGGREGATING POLICY CRITERIA PARAMETERS INTO RANGES FOR EFFICIENT NETWORK ANALYSIS", filed 15 Apr. 2007 for Alain Cohen, Pradeep Singh, Ankit Agarwal, and Venuprakash Barathan, and incorporated by reference herein, teaches a method and system that processes the network configuration to identify each policy, and the criteria associated with each policy. Each criteria of the policies is processed to identify a non-overlapping set of ranges, each range being associated with a particular policy or set of policies. In a preferred embodiment, the criteria include the protocol, the source and destination IP addresses, and the source and destination ports, and a minimal set of ranges is defined for each criteria. The use of a test generator and simulator for verifying security compliance, however, is often a complex and time consuming task, and the completeness of such testing is often indeterminate. An exhaustive application of each test sequence that verifies a security policy across each route that the security policy is expected to be enforced is generally infeasible for application on a typical operational network.

FIG. 1 illustrates an example diagram of a network comprising a number of device groups 110, 120, 130, 140. Device groups are typically convenient groupings that facilitate network management, the members of each group being subject to a common set of security policies. A device group may include one or more nodes of the network, and any node of the network may be included in one or more device groups. In a preferred embodiment, the system of this invention allows a user to define groups using any of a variety of tools. Device groups can be defined using a graphic display of the network, or can be defined based on a given set of rules, such as the "DC group" being defined as all nodes having names that begin with "dc", or all nodes within 30 miles of Wash., D.C., and so on.

FIG. 2 illustrates an example service that an application may invoke. This service, entitled "<ftp-active>", may correspond to a sequence that is required to activate an ftp connection between a client and server. This service includes four steps, or 'service items'. In step 1, a client sends a message to a server, as indicated by the "Direction" entry of "C->S"; in steps 2 and 3, the server sends messages to the client ("S->C"); and in step 4, the client sends a message to the server. Other services may include other devices; for example, the steps may include a client sending a message to a server, followed by the server sending a message to a database device, followed by a response from the database device, and so on. The example service of FIG. 2 is presented for ease of understanding, a typical service would generally include communications among devices at various network tiers, such as a sequence wherein a client device requests data from a server device, the server device requests the data from a database device, the database device sends the data to the server device, and the server device sends the data to the client device, and so on.

The service of FIG. 2 includes parameters that are associated with each service item, such as the port used by each of the client and server devices, other ports that are affected by the service item, and so on. Additionally, any prerequisites required for enabling each service item may also be specified. In the example of FIG. 2, step 2 requires that step 1 be executed before step 2, step 3 requires a prior execution of step 2, and step 4 requires a prior execution of step 3. As noted above, FIG. 2 presents a simple example, the identification of the source and destinations may be more specific, and may include, for example, an identification of the protocol, ICMP code, quality-of-service, and so on. In a preferred embodiment, sets of fields are provided as default identification items, and the user is provided the option of adding or deleting fields as desired.

The service of FIG. 2 is 'generic', and uses symbolic names/aliases for devices, or device groups, such as "CLIENT" and "SERVER". A "transit policy" corresponds to an instantiation of a service on actual network devices or device groups.

FIG. 3 illustrates an example set of transit policies that define allowed or denied services between device groups of the network of FIG. 1. As illustrated on the first set of rows of FIG. 3, the aforementioned "<ftp-active>" service of FIG. 2 is instantiated as an allowed service between the "Enterprise" group 140 and the DMZ_1 group 110. As indicated by the "Device Group" and "Service Alias" columns of FIG. 3, the instances of "CLIENT" in the generic service of FIG. 2 will be replaced by "Enterprise" 140 when this service is instantiated, and "SERVER" will be replaced by "DMZ_1" 110. The second set of rows of FIG. 3 will result in an instantiation/creation of the "<ftp-active>" service, with DMZ_2 120 as the "CLIENT", and DMZ_1 110 as the "SERVER".

The third set of rows of FIG. 3 will instantiate a service entitled "<http>" with Enterprise 140 as the "SOURCE", and DMZ_1 110 as the "DESTINATION", and indicates that such service is intended to be denied (see "Rule" column). The fourth set of rows instantiates a "<telnet>" service that is allowed between Enterprise 140 and DMZ_2 120.

As noted above, FIG. 2 provides a simple example; correspondingly, FIG. 3 illustrates the mapping of only two device groups to each service. One of skill in the art will recognize that the number of fields included in an actual transit policy will correspond to the number of parameterized fields in the corresponding service.

As illustrated in FIG. 1, there are a number of different routes (H-G-F-B-A; H-G-F-E-C-B-A; H-G-F-E-D-B-A; and so on) between a node 141 in device group Enterprise 140 and a node 111 in device group DMZ_1 110. The aforementioned instantiation of an allowed "<ftp-active>" service between Enterprise 140 and DMZ_1 110 implies that each of the service items in the "<ftp-active>" service of FIG. 2 should be allowed on each of the different routes, subject to the port and other parameters specified in FIG. 2 being applied to these routes.

Each node of the network of FIG. 1 will generally include a set of configuration information that determines the transit conditions for each node in the network. These transit conditions will generally include a set of defined addresses and/or ports between which communications are permitted or denied. A conflict between the specified allowed and denied services and the determined/current transit conditions of the devices will indicate a violation of the specified security rule.

As noted above, the term 'transit policy', or simply 'policy' is used to identify an intended permitted or denied communication service between devices. For ease of reference, the term 'transit configuration', or simply 'configuration' is used hereinafter to refer to the configuration of devices in the network that affect the communication of messages through the devices. It is an objective of this invention to determine whether the transit configuration of the network supports the defined transit policies, and to identify any violations of the transit policies, a violation being defined as either a transit configuration that permits a service that a transit policy identifies as being denied, or a transit configuration that denies a service that a transit policy identifies as being permitted.

Figures 5, 6:
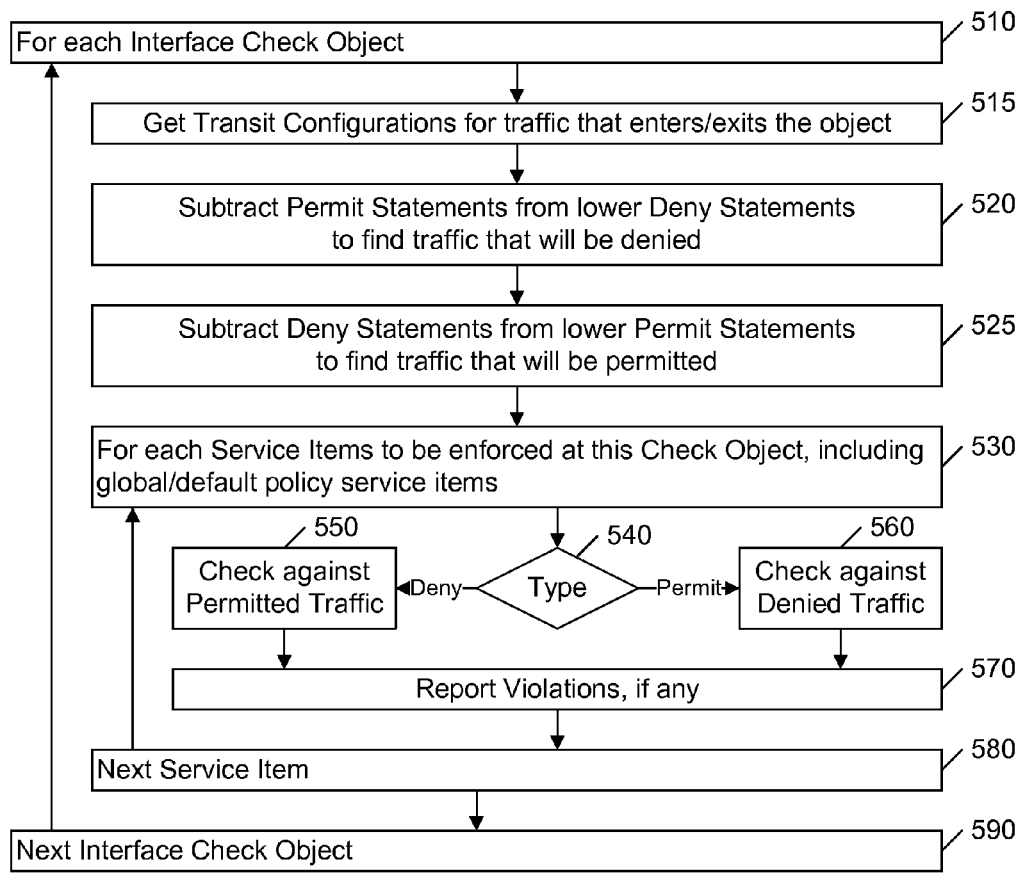
FIG. 5 illustrates an example flow diagram for comparing each interface check object to the transit configuration of each interface to identify violations of transit policies in accordance with this invention.
FIG. 6 illustrates an example output report, identifying violations and compliances with a set of transit policies.

FIGS. 4A, 4B, and 5 illustrate example flow diagrams for auditing the transit configuration of a network to identify violations of defined transit policies. In a preferred embodiment of this invention, the defined transit policies between device groups of the network are processed to determine the transit policies at each network device corresponding to these network transit policies. Thereafter, the transit configuration of each device is compared to its intended transit policy, and any inconsistencies are reported as violations.

FIGS. 4A and 4B illustrate example flow diagrams for preprocessing the transit policies to identify the corresponding policies at each device, and FIG. 5 illustrates an example flow diagram for comparing the intended device policies to the actual device configurations.

FIG. 4A illustrates an overview of the preprocessing, while FIG. 4B provides details for implementing such preprocessing.

At 410, the intended transit policies are defined, preferably by identifying the defined services 401 that should be permitted or denied between or among defined device groups 402, as discussed above with regard to FIGS. 2 and 3.

At 420, the transit policies are processed to define connection groups, each connection group being a collection of all the service items from all the transit policies between the same source and destination device groups. For example, from the 'direction' field of transit policy of FIG. 3, in the instantiation of the <ftp-active> service with 'Enterprise' as the CLIENT, and 'DMZ_1' as the SERVER, the first and fourth items in the <ftp-active> service of FIG. 2 will be included in a connection group between device groups 'Enterprise' and 'DMZ_1', and the second and third will be included in a connection group between device groups 'DMZ_1' and 'Enterprise'. As each service item is processed within each service, a count is maintained to indicate the order in which each item is applied for that service. For example, the four items of <ftp-active> that are added to their respective connection group will each include their corresponding connection order, 1, 2, 3, 4.

At 430, all of the possible connecting routes within each connection group are determined. As noted above, devices may be dynamically configured during the execution of a communication service, and this process is configured to determine and configure each of these routes based on the order in which each service item is applied, as detailed further below.

At 450, the transit policy of each device along each route is defined in terms of ingress and egress 'check objects' that define the specific elements of the particular interface that will be required for testing the transit policies The ingress interface check object represents the interface through which traffic of the address range route flows into the device, and the egress interface check object represents the interface from which the traffic exits the device. A typical transit policy will include specific protocols, address or port ranges, and so on, for which each particular service item of the defined service is applicable. During this process, these parameters are identified for each interface of each device, to facilitate comparison with the actual device configuration at each interface.

Upon completion of this processing, all of the policies that are to be checked at each interface of each device are defined, so that the configuration of the interfaces of each device can be assessed substantially independently to determine whether the device is properly configured to provide these intended transit policies, and to specifically identify the interfaces that may need to be reconfigured to support the defined transit policies, as illustrated in FIG. 5.

In FIG. 5, the loop 510-590 is configured to compare the configuration of each of the check objects to the intended network transit policies at the corresponding interface.

At 515, the transit configuration of the interface referenced by the check object is obtained, including, for example, the Access Control Lists (ACLs), Security Rules, and so on, that are applicable to the traffic that traverses the interface of the device in either direction. In addition to identifying the specific configuration of each particular interfaces, any "device configuration" parameters that apply to all traffic transiting the device, regardless of the ingress and/or egress interface, are associated with each corresponding interface object.

Generally, the configuration rules at each interface of a device in a network are processed in a given order relative to their location in a given list of defined rules at the device. Blocks 520-525 are provided to process such lists to determine the set of specific order-independent rules corresponding to the ordered list of rules. For example, if a first rule in the list permits traffic to be sent to addresses B and D, and a lower-level rule denies traffic to be sent to addresses A-F, inclusive, that lower-level rule is redefined as a denial of traffic to addresses A, C, E, and F, because the first rule will have allowed traffic to be sent to addresses B and D. After this processing, two sets of traffic will be defined for each interface direction: traffic that will be denied, and traffic that will be permitted.

The loop 530-580 compares each service policy item that is to be applied at the check object. Included in this loop are any service policy items that are implied by 'global' or 'default' policies. For example, within select parts of the network, a global policy may be to deny any traffic that is not explicitly permitted, or to permit any traffic that is not explicitly denied, and so on.

If, at 540, the service policy item identifies permitted traffic, it is compared to the set of traffic that will be denied, at 560; if the service policy item identifies denied traffic, it is compared to the set of traffic that will be permitted, at 550. If the configuration of the interface indicates that traffic that is identified by the service policy item as intended to be permitted will actually be denied, or that traffic that is identified as intended to be denied will actually be permitted, a violation of the intended policy will be reported, at 570.

In a preferred embodiment, options are provided for processing service policy denials. Along any given route, a single denial configuration will be effective for denying traffic via that route. However, in highly secure environments, traffic denial may be desired at each node along the route. In some embodiments, specific nodes (e.g. firewalls) may be relied upon for providing the appropriate denials. Support for each of these alternatives, and others, can be provided as either a pre-processing or post-processing task, or a combination of both. In the pre-processing embodiment, the denial service policy items that are applied to each check object are processed to determine whether the denial should be applied at that particular check object. In the post-processing embodiment, the reported violations are filtered to eliminate the denials at interfaces that are not required to impose the denial.

The resultant reported violations are presented to the user in any of a variety of forms. In a simple embodiment, a list of all violations is presented. In a more interactive presentation, a graphic display is provided, with devices that include violations identified by color or other distinguishing characteristic. Selecting a device with violations will preferably cause the route(s) being violated to be highlighted, with a textual presentation of the policy being violated and the configuration of the violating interface, preferably in a separate text pane of the display, or a 'pop-up' window.

FIG. 6 illustrates an example report that displays the compliance with a set of transit security policies, in this example, three instantiations of a "SAP" service. The entries in the "Tier" column 610 are the symbolic names of the device or device group used in the definition of the service at each tier; the entries in the corresponding "Device Group" column 620 are the names of the device groups in the actual network. The number of tier rows corresponds to the number of devices or device groups defined in the service. In this example, there are three device groups (tiers) defined; in the example of FIG. 2, there were two device groups defined.

The rule column 630 indicates whether the service should be permitted or denied, and the status column 650 indicates the results of the above analysis. Preferably, the indicators are color coded, a red circle indicating a violation, and a green square with a 'check mark' indicates conformance with the policy rule. In the example of FIG. 6, the SAP Service 640 is expected to be permitted between the Finance, Web_DMZ, and SAP_DataCenter Device Groups, but the status symbol 651 indicates that this service is denied by the configuration of one or more devices forming the connections. In like manner, the SAP Service is expected to be Denied between the Engineering, Web_DMZ, and SAP_DataCenter Device Groups, but the status 653 indicates that one or more of the Devices in the Device Groups would be able to send or receive traffic associated with the SAP Service.

If a violation appears, a 'drill down' indicator appears, and allows a user to view the details of the violation, including, as discussed above, an identification of the devices that are not configured properly to enforce the policy, an identification of the blocked connections, and so on. Other report formats are also preferably provided, including organization by configuration security and organizational policy, by device, by protocol, and so on.

Tools are also preferably provided to facilitate 'repair' of the network configuration to satisfy a violated policy. For example, if a service is to be denied in a multiple-route connection group, a set of devices may be identified to effect this denial with minimal configuration changes. Similarly, an optional output from the system may be a list of the configuration changes required to effect each policy, as well as the automated production of 'work orders' that facilitate effecting such configuration changes on the actual network devices.

FIG. 4B provides a more detailed example flow diagram for the preprocessing of network transit policies as discussed above with regard to FIG. 4A.

The create connection groups block 420 is preferably performed by loop 421-427, which processes each transit policy to determine a connection group that is associated with each service item in the specified service of this transit policy. As noted above with regard to FIG. 2, a service describes a flow of communications between two or more symbolic devices; for example, a service may refer symbolically to a "source" device and a "destination" device, a "database" device, a "server" device, a "client" device, and so on; the term 'tier' is often used to refer to a symbolic name. A transit policy effectively instantiates a defined service between two or more actual devices by specifying an actual device name, or device group name, that corresponds to each symbolic name in the defined service.

At 422, the service referenced in the transit policy is identified, as are the actual device groups that are to be mapped to the symbolic names in the defined service. For example, the first transit policy of FIG. 3 identifies the service as "<ftp-active>", defined in FIG. 2, and the actual device groups "Enterprise" and "DMZ_" corresponding to the symbolic names of "Client" and "Server" in the defined service "<ftp-active>".

The loop 423-426 processes each item in the defined service, substituting the actual device groups at each occasion of their corresponding symbolic names, at 424. Generally, each service item will only reference a pair of devices, a 'source' device that provides the traffic of this service item, and a 'destination' device that receives the traffic. At 425, the service item is added to the connection group associated with each pair of source-destination device groups. As noted above, the connection group includes all the service items from all that transit policies that are between the same source and destination device groups, and each service item includes an identification of the order in which it is applied within its service.

The loop 431-435 determines each of the connection routes associated with each connection group. As defined herein, a connection route defines all of the possible routes between the source and destination device groups. For each source-destination connection group, the route may include a forward connection configuration and a reverse connection configuration. In some networks, an address translation occurs as messages traverse particular security devices, such as firewall devices. Thus, the reverse connection, from the destination to the source, may have a different address for the source than it's 'actual'/original address.

The loop 451-457 determines the ingress and egress objects that are to be checked at each device within each connection route, to validate the enforcement, at the device level, of all of the defined network transit policies.

The connection route represents all the routes between the same source-destination device group pair. The service items in the associated connection group will generally include a set of parameter values for which the service is applicable; for convenience, these parameters are referred to herein as address parameters, but generally include other distinguishing information, such as the applicable protocol, in addition to the device and port addresses of the interface. To reduce subsequent redundant processing, composite sets of addresses corresponding to the individual service addresses are determined, at 452, preferably using techniques such as those taught in the above-referenced copending U.S. patent application Ser. No. 11/735,474. In this copending application, each criteria of the policies associated with a source-destination pair is processed to identify a non-overlapping set of address ranges, each address range being associated with a particular policy or set of policies. In a preferred embodiment, the criteria include the protocol, the source and destination IP addresses, and the source and destination ports, from which a minimal set of address ranges is defined for each criteria.

At 453, the connection route is partitioned into address range routes based on this minimal set of address ranges, each address range route representing a subset of the connection route that includes all of the routes between the same source and destination address range.

In the loop 454-456, each address range route is processed by following the route from beginning to end, identifying the interfaces on each device along the route. At 455, an ingress and an egress interface check object is defined at each device along the route, each interface check object representing the data of that interface that will be required for testing the transit policy at that interface, as discussed above.

Figure 7:
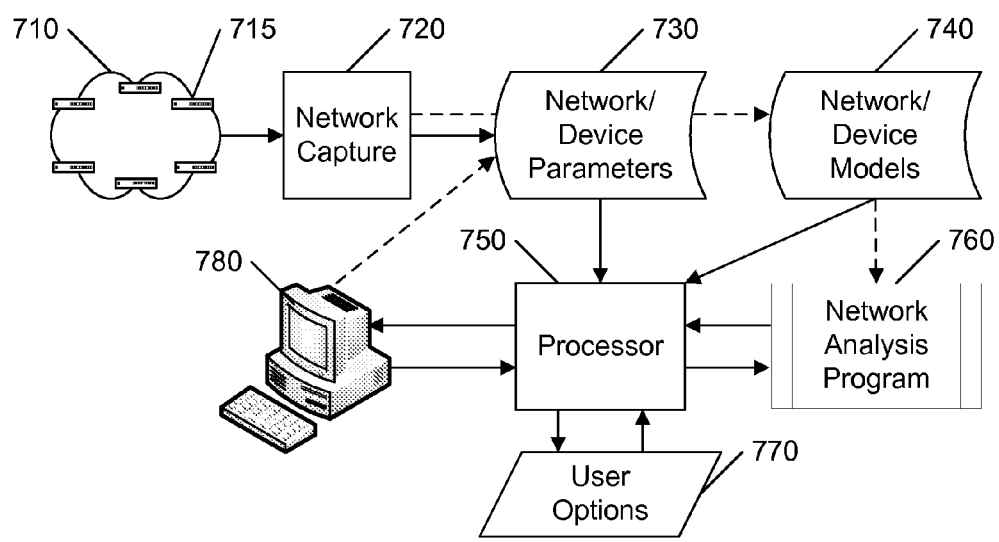
FIG. 7 illustrates a system that facilitates an embodiment of this invention.

FIG. 7 illustrates a system that facilitates an embodiment of this invention. A network 710 includes one or more nodes 715. A network capture module 720 is preferably used to capture configuration and other parameters associated with the network 710 and/or the nodes 715; optionally, a user interface device 780 allows a user to provide network and/or device parameters directly.

A processor 750 is configured to execute a network analysis program 760 that embodies one or more aspects of this invention. The network analysis program 760 causes a processor 750 to interact with one or more of the user interface device 780, the database of network and/or device parameters 730, the database of network and/or device models 740, and predefined user options 770 to effect the one or more aspects of this invention, as detailed above. Optionally, the network analysis program 760 may be coupled to the database of network/device models 740 directly.

Optionally, some or all of the processor 750 and some or all of the network analysis program 760 may be embodied as one or more special purpose hardware devices to improve the efficiency and/or speed of the network analysis program 760, or to achieve particular functions that are not achievable by a software-only embodiment of this invention. In like manner, one of skill in the art will recognize that the network analysis program 760 may include a variety of other network analysis tools, in addition to the analysis processes detailed above, to provide an integrated analysis tool for a variety of network analyses tasks.

The foregoing merely illustrates the principles of the invention. It will thus be appreciated that those skilled in the art will be able to devise various arrangements which, although not explicitly described or shown herein, embody the principles of the invention and are thus within its spirit and scope. For example, during the process of determining all of the routes between a source and destination, if no route is found, the connection group can be marked as such, and during the reporting process, all service items in this group that are intended to be permitted are reported as failures. Additionally, although the invention is presented assuming that all devices will be checked, and that the configuration of each device is relatively static, one of skill in the art will recognize that a variety of user options can be provided to facilitate a more meaningful analysis in a given situation. For example, a user may be provided the option of identifying ports that are dynamically or manually configurable, and may provide a default and/or explicit assertion of transit configurations, such as an assertion that traffic from a given set of addresses will always be allowed at particular ports, and so on. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
receiving, at a processing machine, a plurality of transit policies, each policy indicating whether a given service is to be allowed for two or more device groups of a network, a device group including one or more devices of the network,
determining, by the processing machine, a plurality of routes among the device groups in the network,
identifying, by the processing machine, interface check objects at each interface along each of the routes,
comparing, by the processing machine, configuration settings at each interface check object to a corresponding transit policy of the plurality of transit policies, and
identifying, by the processing machine, violations of the transit policies.

2. The method of claim 1, wherein determining the plurality of routes includes: identifying each unique pair of source and destination nodes used within the services indicated by the plurality of transit policies, and determining each route between each unique pair of source and destination nodes.

3. The method of claim 2, wherein each service includes one or more service items, each service item identifying a source node and a destination node associated with the service item.

4. The method of claim 2, including processing the transit policy at each interface check object to identify one or more sets of address ranges having a common transit policy, and wherein comparing the configuration settings includes comparing the configuration settings for each of the sets of address ranges.

5. The method of claim 2, including determining one or more transit configurations at each interface check object, each transit configuration indicating a configuration address range and a transit state that indicates whether traffic within the configuration address range is permitted or denied, and processing the one or more transit configurations to determine a resultant configuration setting for each configuration address range.

6. The method of claim 5, including processing the transit policy at each interface check object to identify one or more sets of policy address ranges having a common transit policy, and wherein comparing the configuration settings includes comparing the configuration settings for each configuration address range with the transit policy of the one or more sets of policy address ranges.

7. The method of claim 6, wherein comparing the configuration settings includes comparing permitted transit policies with denied configuration settings and comparing denied transit policies with permitted configuration settings to identify the violations of the transit policies.

8. The method of claim 4, wherein determining the one or more transit configurations includes allowing a user to specify one or more transit configurations for one or more of the interface check objects.

9. The method of claim 1, wherein each service includes one or more service items, each service item identifying a source node and a destination node associated with the service item.

10. The method of claim 1, including processing the transit policy at each interface check object to identify one or more sets of address ranges having a common transit policy, and wherein comparing the configuration settings includes comparing the configuration settings for each of the sets of address ranges.

11. The method of claim 10, including determining one or more transit configurations at each interface check object, each transit configuration indicating a configuration address range and a transit state that indicates whether traffic within the configuration address range is permitted or denied, and processing the one or more transit configurations to determine a resultant configuration setting for each configuration address range.

12. The method of claim 11, including processing the transit policy at each interface check object to identify one or more sets of policy address ranges having a common transit policy, and wherein comparing the configuration settings includes comparing the configuration settings for each configuration address range with the transit policy of the one or more sets of policy address ranges.

13. The method of claim 12, wherein comparing the configuration settings includes comparing permitted transit policies with denied configuration settings and comparing denied transit policies with permitted configuration settings to identify the violations of the transit policies.

14. The method of claim 1, including providing a display of violations of the transit policies.

15. The method of claim 14, including providing an identification of one or more devices corresponding to one or more of the violations.

16. A computer program on a non-transitory computer-readable media that, when executed, configures a processor to:
receive a plurality of transit policies, each policy indicating whether a given service is to be allowed for two or more device groups of a network, a device group including one or more devices of the network,
determine a plurality of routes among the device groups in the network,
identify interface check objects at each interface along each of the routes,
compare configuration settings at each interface check object to a corresponding transit policy of the plurality of transit policies, and
identify violations of the transit policies.

17. The program of claim 16, wherein the processor is configured to determine the plurality of routes by:
identifying each unique pair of source and destination nodes used within the services indicated by the plurality of transit policies, and
determining each route between each unique pair of source and destination nodes.

18. The program of claim 17, wherein each service includes one or more service items, each service item identifying a source node and a destination node associated with the service item.

19. The program of claim 17, wherein the processor is configured to: process the transit policy at each interface check object to identify one or more sets of address ranges having a common transit policy, and compare the configuration settings by comparing the configuration settings for each of the sets of address ranges.

20. The program of claim 17, wherein the processor is configured to: determine one or more transit configurations at each interface check object, each transit configuration indicating a configuration address range and a transit state that indicates whether traffic within the configuration address range is permitted or denied, and process the one or more transit configurations to determine a resultant configuration setting for each configuration address range.

21. The program of claim 20, wherein the processor is configured to: process the transit policy at each interface check object to identify one or more sets of policy address ranges having a common transit policy, and compare the configuration settings by comparing the configuration settings for each configuration address range with the transit policy of the one or more sets of policy address ranges.

22. The program of claim 21, wherein the processor is configured to compare the configuration settings by comparing permitted transit policies with denied configuration settings and comparing denied transit policies with permitted configuration settings to identify the violations of the transit policies.

23. The program of claim 19, wherein the processor is configured to determine the one or more transit configurations by allowing a user to specify one or more transit configurations for one or more of the interface check objects.

24. The program of claim 16, wherein each service includes one or more service items, each service item identifying a source node and a destination node associated with the service item.

25. The program of claim 16, wherein the processor is configured to: process the transit policy at each interface check object to identify one or more sets of address ranges having a common transit policy, and compare the configuration settings by comparing the configuration settings for each of the sets of address ranges.

26. The program of claim 16, wherein the processor is configured to: determine one or more transit configurations at each interface check object, each transit configuration indicating a configuration address range and a transit state that indicates whether traffic within the configuration address range is permitted or denied, and process the one or more transit configurations to determine a resultant configuration setting for each configuration address range.

27. The program of claim 26, wherein the processor is configured to: process the transit policy at each interface check object to identify one or more sets of policy address ranges having a common transit policy, and compare the configuration settings by comparing the configuration settings for each configuration address range with the transit policy of the one or more sets of policy address ranges.

28. The program of claim 27, wherein the processor is configured to compare the configuration settings includes comparing permitted transit policies with denied configuration settings and compare denied transit policies with permitted configuration settings to identify the violations of the transit policies.

29. The program of claim 16, wherein the processor is configured to provide a display of violations of the transit policies.

30. The program of claim 29, wherein the processor is configured to provide an identification of one or more devices corresponding to one or more of the violations.

31. A system comprising:
- a display device,
- a processor, and
- a memory that is configured to store a network analysis program that configures the processor to:
    - receive a plurality of transit policies, each policy indicating whether a given service is to be allowed for two or more device groups of a network, a device group including one or more devices of the network,
    - determine a plurality of routes among the device groups in the network,
    - identify interface check objects at each interface along each of the routes,
    - compare configuration settings at each interface check object to a corresponding transit policy of the plurality of transit policies, and
    - display violations of the transit policies on the display device.

32. The system of claim 31, wherein the processor is configured to: determine one or more transit configurations at each interface check object, each transit configuration indicating a configuration address range and a transit state that indicates whether traffic within the configuration address range is permitted or denied, and process the one or more transit configurations to determine a resultant configuration setting for each configuration address range.

33. The system of claim 32, wherein the processor is configured to: process the transit policy at each interface check object to identify one or more sets of policy address ranges having a common transit policy, and compare the configuration settings by comparing the configuration settings for each configuration address range with the transit policy of the one or more sets of policy address ranges.

34. The system of claim 33, wherein the processor is configured to compare the configuration settings includes comparing permitted transit policies with denied configuration settings and compare denied transit policies with permitted configuration settings to identify the violations of the transit policies.

35. The program of claim 34, wherein the processor is configured to display an identification of one or more devices corresponding to one or more of the violations.

* * * * *